United States Patent [19]
White, Jr. et al.

[11] 3,853,017
[45] Dec. 10, 1974

[54] ENDLESS POWER TRANSMISSION BELT

[75] Inventors: Jack D. White, Jr., Springfield; Joseph P. Miranti, Jr., Republic, both of Mo.

[73] Assignee: Dayco Corporation, Dayton, Ohio

[22] Filed: Nov. 6, 1973

[21] Appl. No.: 413,293

[52] U.S. Cl. .................................... 74/234, 74/237
[51] Int. Cl. ............................ F16g 5/00, F16g 1/22
[58] Field of Search ............................... 74/234, 237

[56] References Cited
UNITED STATES PATENTS

| | | | |
|---|---|---|---|
| 2,167,384 | 7/1939 | Freedlander | 74/237 |
| 2,728,239 | 12/1955 | Adams, Jr. | 74/234 X |
| 3,724,284 | 4/1973 | Eng et al. | 74/234 |

*Primary Examiner*—Leonard H. Gerin

[57] ABSTRACT

An endless power transmission belt made primarily of elastomeric materials is provided and has a plurality of laterally spaced belt elements and a tie band interconnecting the belt elements with the tie band being reinforced by a knitted fabric layer which assures that the tie band has sufficient strength to hold the belt elements together as a unit yet allows tie band extensibility to take into account adverse operating conditions of the belt.

14 Claims, 5 Drawing Figures

PATENTED DEC 10 1974

3,853,017

ENDLESS POWER TRANSMISSION BELT

BACKGROUND OF THE INVENTION

There are numerous so-called banded endless power transmission belts in present use which are made primarily of elastomeric materials and are comprised of a plurality of belt elements banded together with a tie band. In general, the tie bands of these presently used banded belts are strengthened by using conventional woven fabrics which may have warps and wefts arranged at various angles or are provided with specially designed lateral or transverse cords in the tie bands to hold the belt elements together. These previously proposed banded belts are deficient because they tend to fail rapidly once subjected to adverse conditions caused by excessive sheave wear, or foreign objects such as pebbles, grain, and the like being interposed between each of these belts and its associated sheaves. For example, each of these previously proposed banded belts when subjected to such adverse conditions is not capable of providing adequate movements laterally or transverse the longitudinal axis of the belt at locations between the belt elements resulting in the tie bands tending to shear comparatively easily at such locations between individual belt elements, whereby each of these previously proposed banded belts has a poor service life when compared with an ordinary single element belt.

SUMMARY

This invention provides an endless power transmission belt which overcomes the above-mentioned deficiencies and such belt comprises a plurality of laterally spaced belt elements and a tie band interconnecting the belt elements with the tie band being reinforced by a knitted fabric layer which allows tie band extensibility between the belt elements in an infinite number of directions enabling efficient engagement of each element with opposed surfaces comprising a groove of an associated sheave even under adverse conditions with the knitted fabric layer holding the elements together as a unitary construction substantially free of any tendency for the band to shear between the belt elements.

Other details, uses, and advantages of this invention will be readily apparent from the exemplary embodiments thereof presented in the following specification, claims, and drawing.

BRIEF DESCRIPTION OF THE DRAWING

The accompanying drawing shows present preferred embodiments of this invention, in which.

DETAILED DESCRIPTION OF THE DRAWING

Figure 1:
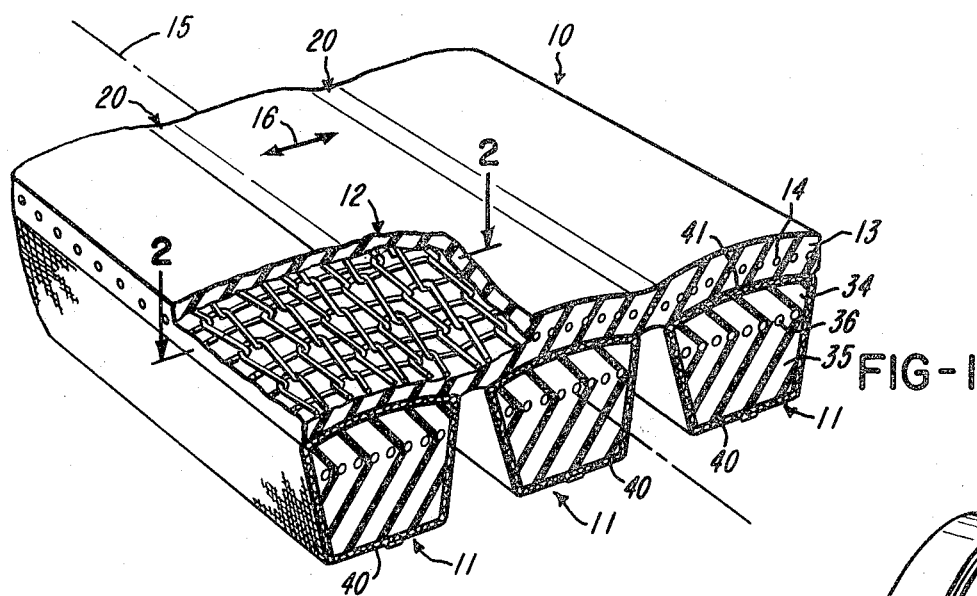
FIG. 1 is a perspective view with parts in cross section, parts in elevation, and parts broken away illustrating one exemplary embodiment of the belt of this invention.
Figure 2:
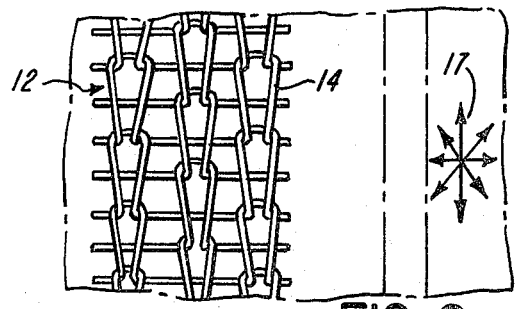
FIG. 2 is a fragmentary plan view taken essentially on the line 2—2 of FIG. 1 and illustrating the knitted fabric which is used in the tie band and schematically illustrating that the fabric is extensible in an infinite number of directions particularly between belt elements, for example.

Reference is now made to FIG. 1 of the drawing which illustrates one exemplary embodiment of an endless power transmission belt of this invention which is made primarily of elastomeric materials and is designated generally by the reference numeral 10. The belt 10 comprises a plurality of laterally spaced belt elements of trapezoidal cross-sectional configuration and each designated generally by the reference numeral 12 interconnecting the belt elements. The tie band 12 is made of a suitable elastomeric material shown in this example as a rubber compound or matrix 13 and is reinforced by a knitted fabric 14 which will be described in more detail subsequently and the knitted fabric layer allows tie band extensibility expecially between the belt elements 11 along an infinite number of paths both parallel to the longitudinal axis 15 of the belt 10 and transverse such longitudinal axis as indicated at 16 and indeed in an infinite number of directions in a plurality of planes and designated by the cluster of double arrows 17 in FIG. 2 for the plane of the drawing thereby allowing efficient engagement of each element 11 with opposed surfaces comprising a groove of an associated sheave even under adverse conditions with the knitted fabric layer 14 holding the elements 11 together as a unitary construction or unit substantially free of any tendency for the band 12 to shear at locations 20 between the belt elements 11.

Figure 3:
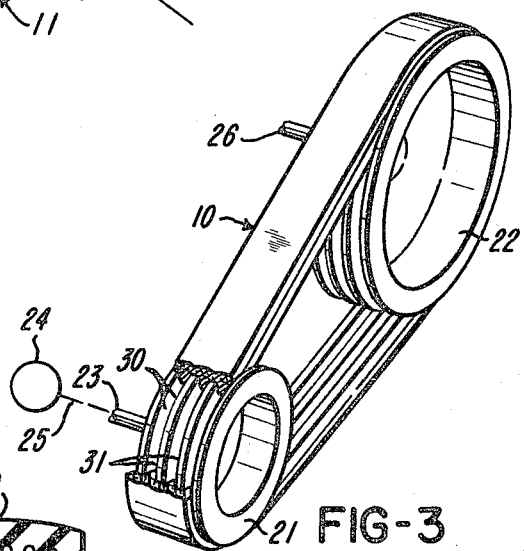
FIG. 3 is a perspective view with parts in cross section and parts broken away particularly illustrating the belt of FIG. 1 installed in associated sheaves comprising a drive system.

To highlight the unique character of the tie band 12 of this invention, reference is now made to FIG. 3 of the drawing which illustrates the belt 10 installed in position around a driving sheave 21 and a driven sheave 22 with the driving sheave 21 having a drive shaft 23 extending therefrom which is operatively connected to a prime mover or drive motor 24 by a mechanical connection 25. The driven sheave 22 is operatively connected to a shaft 26 which is in turn suitably connected to a mechanical apparatus (not shown) which is to be driven by motor 24 through the use of the power transmission belt 10 of this invention.

A banded belt such as the belt 10 is often operated in sheaves, such as the sheave 21, having sets of opposed surfaces 30 which define opposed walls of sheave grooves 31 and such surfaces wear excessively with extended use whereby there is a tendancy when engaging belt elements 11 against worn surfaces 30 for the tie band 12 to stretch and shear at locations between adjacent belt elements 11. However, with the provision of tie band 12 having the knitted reinforcing fabric 14, the tie band can stretch a substantial amount transverse the longitudinal axis 15 of the belt particularly at locations 20 between belt elements and this substantial transverse extensibility allows the belt elements 11 to nest in grooves 31 while efficiently engaging the worn surfaces 30 without any tendency for the tie band 12 to shear at the locations 20 between the belt elements 11.

A similar stretching of the belt tie band 12 may occur in one or more planes under situations where foreign objects such as pebbles, dirt, grain - in instances where the belt 10 is used in agriculture, or the like, tend to lodge between the belt and its associated sheaves. In these types of situations, the stretchability of the knitted fabric 14 coupled with the inherent stretchability of the elastomeric matrix 13 for the knitted fabric in an infinate number of directions allows stretching even to the point of localized bulging yet without shear at locations 20 in a manner not possible with previously proposed banded belts.

Referring again to FIG. 1 of the drawing, it will be seen that each of the V-belt elements 11 has upper tension section 34, a lower compression section 35, and a load-carrying section comprised of a helically wound load-carrying cord 36 bonded between the tension and compression sections 34 and 35 respectively. Each V-belt element 11 also has an outer fabric cover 40 which may be made of a woven fabric in accordance with techniques which are known in the art and it will be seen that the tie band 12 extends across the belt elements 11, in essence, binding together the tension sections 34 thereof by being bonded against the outer surface of that portion of the cover 40 which covers the tension section 34, and as illustrated at 41.

Figure 4:
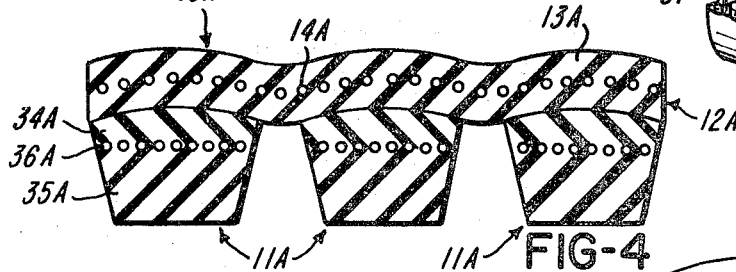
FIG. 4 is a cross-sectional view illustrating another exemplary embodiment of the belt of this invention.
Figure 5:
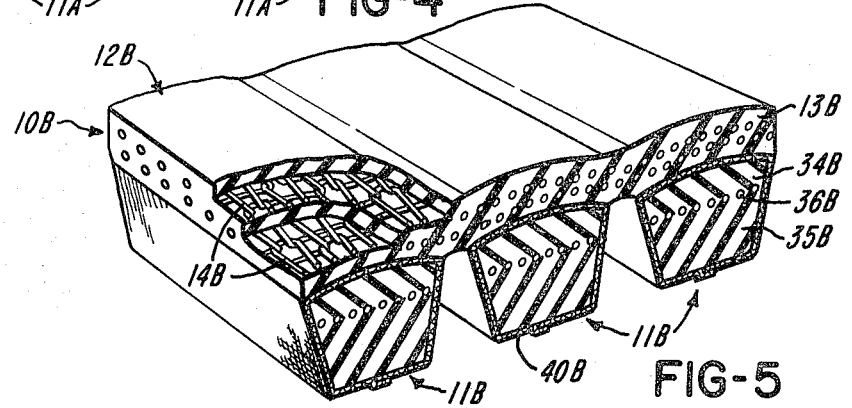
FIG. 5 is a view similar to FIG. 1 illustrating still another exemplary embodiment of the belt of this invention.

Other exemplary embodiments of the belt of this invention are illustrated in FIGS. 4 and 5. The belts illustrated in FIGS. 4 and 5 are similar to the belt 10; therefore, such belts will be designated by the reference numerals 10A and 10B respectively, and representative parts of each belt which are similar to corresponding parts of the belt 10 will be designated in the drawing by the same reference numeral as in the belt 10 (whether or not such components are mentioned in the specification) followed by an associated letter designation, either A or B, and not described again in detail. Only those component parts of each belt 10A and 10B which are different from corresponding parts of the belt 10 will be designated by a new reference numeral also followed by the associated letter designation and described in detail.

The main difference between the belt 10 and the belt 10A is that the belt 10A instead of having covered belt elements of trapezoidal cross section, has belt elements 11A which are uncovered, i.e., such elements are what are commonly referred to in the art as "raw-edged elements."Nevertheless, each element 11A has a tension section 34A, a compression section 35A, and a helically wound load-carrying cord 36A with the elements 11A being banded together by an integral tie band 12A which has a knitted fabric layer 14A embedded in an elastomeric matric 13A.

The main difference between the belt 10B and the belt 10 is that instead of having a single knitted layer 14B in its tie band, as in the case of the belts 10 and 10A, the belt 10B has a plurality of two knitted fabric layers 14B provided in its tie band 12B. It will also be seen that, in a similar manner as in the belt 10, each belt element 11A has a tension section 34B, a compression section 35B, and a load-carrying section comprised of a helically wound load-carrying cord 36B bonded between the tension and compression sections 34B and 35B respectively, with each element 11B also having an outer cover 40B.

The belts 10A and 10B have unique advantages which are similar to the belt 10, in that the knitted fabric layers provided in the tie bands thereof provide the required strength to hold that belt elements together as a unitary construction yet in each instance the knitted fabric allows extensibility of the tie band particularly between immediately adjacent belt elements in an infinite number of directions or paths in a manner heretofore unknown in banded endless power transmission belts.

Each knitted layer 14, 14A, and 14B is provided in accordance with techniques which are well known in the art whereby each knitted layer is made by interlooping one or more ends of yarn in the manner illustrated in the drawing. It will also be appreciated that the knitted layer may be made of any suitable material known in the art including natural fibers, glass fibers, synthetic fibers, elastomeric fibers, and blends of these various fibers, as well as metal.

Further, it will be appreciated that even though the knitted layer is in each instance shown as a single layer, it is to be understood that so-called double-knit materials and fabrics may be used. Also, in addition to the plurality of two layers of knitted material illustrated in FIG. 5, three and even more adjoining or spaced layers may be employed, if desired.

The knitting may be achieved using so-called norun knit fabrics, warp-knit fabrics, weft-knit fabrics, and any other type of knit fabrics known in the art. Further, because of the so-called extensibility of knit fabrics in an infinite number of directions, i.e., 360° from any given point in an infinite number of planes, there is no need to attempt to align the various threads and loops of each layer with respect to the longitudinal axis of the banded belt such as the longitudinal axis 15 of the belt 10, for example. In this connection it will be seen that, for convenience, the loops of layer 14 have been shown in the belt 10 as arranged roughly parallel to the axis 15. Also, in the belt 10B each of the layers 14B has its loops arranged roughly parallel to the belt axis.

However, the unique character of knitted fabric is such that the loops may be arranged in any desired direction relative to the belt axis in the banded belt of this invention which simplifies manufacturing techniques yet does not adversely affect the 360° stretchability of the knitted fabric and its associated band especially between belt elements.

Although various materials have been mentioned above which may be used in making the knitted layers 14, 14A, and 14B, exceptional results have been obtained using nylon in the making of knitted fabric layers. It has also been found desirable to coat the knitted nylon material with a suitable adhesive to promote adhesion thereof in the matrix material comprising its associated tie band.

In those applications where belt elements of a banded belt are completely covered with an outer fabric cover such as the cover 40 of the belt 10, the tie band 12 adheres thereto in a more tenacious manner when treating the cover 40 with a phenolic solution.

The improved endless power transmission belt of this invention provides improved performance as described above, and by using a knitted fabric layer as the strength portion of the tie band manufacturing is easier for reasons other than the elimination of a need to specially align or bias cut the knitted material. In particular, previously proposed materials tend to shrink laterally when flexed. This lateral shrinkage is critical in so-called "green"bands, i.e., bands that have not been cured, because it is difficult to fit a "green"band to its associated grooved spool. The improved lateral or transverse extensibility of the knitted material in each tie band alleviates this problem and thereby makes the belt of this invention easier to produce.

It will also be appreciated that with the tie bands 12, 12A, and 12B being reinforced by knitted fabric, there is less tendency for progressive linear failure should a foreign object penetrate the knitted fabric. Further, in those applications where knitted fabric is a so-called no-run knitted fabric, it is indeed believed that a hole or aperture can be punched in the tie band without propagation of failure along the entire length of the tie band between belt elements.

The belts 10, 10A, and 10B of this invention may be made using any suitable apparatus, method, and production technique. Further, each banded belt is made primarily of elastomeric materials; and, any suitable elastomeric material may be used in making the belts 10, 10A, and 10B including natural and synthetic rubber compounds as well as plastic materials including all types of synthetic plastic materials used in the art to make endless power transmission belts.

In this disclosure of the invention, each of the belts 10, 10A, and 10B is shown as having a plurality of three belt elements; however, it is to be understood that the belt of this invention may have two belt elements or any desired number of elements such as four and more.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt comprising a plurality of laterally spaced belt elements and a tie band interconnecting said belt elements, said tie band being reinforced by a knitted layer which allows tie band extensibility between said belt elements in an infinite number of directions enabling efficient engagement of each element with opposed surfaces comprising a groove of an associated sheave even under adverse conditions with said knitted layer holding said elements together as a unitary construction substantially free of any tendency for said band to shear between said elements.

2. A belt as set forth in claim 1 in which said tie band is made of an elastomeric material and said knitted layer is embedded therein.

3. A belt as set forth in claim 2 in which each of said elements has a substantially trapezoidal cross-sectional configuration and is comprised of tension section, a compression section, and a load-carrying section with said tie band binding said elements together by bonding each element adjacent the tension section thereof.

4. A belt as set forth in claim 1 in which each of said belt elements has an outer woven cover and said tie band is integrally bonded to each element against the top surface of its woven cover.

5. A belt as set forth in claim 3 in which each of said belt elements is a raw-edged element and said tie band is bonded against the top surface of the tension section of each element.

6. A belt as set forth in claim 1 in which said knitted layer is made of a knitted fabric material.

7. A belt as set forth in claim 1 in which said knitted layer is made of a knitted nylon fabric material.

8. A belt as set forth in claim 1 in which said knitted layer is made of natural fibers.

9. A belt as set forth in claim 1 in which said knitted layer is made of synthetic fibers.

10. A belt as set forth in claim 1 in which said knitted layer is made of glass fibers.

11. A belt as set forth in claim 1 in which said knitted layer is made of metal.

12. A belt as set forth in claim 1 and further comprising at least another knitted layer in said tie band arranged in vertically spaced relation from said first-named layer.

13. A belt as set forth in claim 2 in which said elastomeric material is a rubber compound.

14. A belt as set forth in claim 2 in which said elastomeric material is a synthetic plastic material.

* * * * *